(12) United States Patent
Baeuerle et al.

(10) Patent No.: US 6,729,124 B2
(45) Date of Patent: May 4, 2004

(54) METHOD AND ARRANGEMENT FOR OPERATING AN INTERNAL COMBUSTION ENGINE

(75) Inventors: Michael Baeuerle, Ditzingen-Heimerdingen (DE); Carsten Reisinger, Stuttgart (DE); Guido Porten, Enzweihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/219,493

(22) Filed: Aug. 16, 2002

(65) Prior Publication Data

US 2003/0051466 A1 Mar. 20, 2003

(30) Foreign Application Priority Data

Aug. 16, 2001 (DE) .......................... 101 40 120

(51) Int. Cl.[7] ................................ F01N 3/00
(52) U.S. Cl. ...................... 60/285; 60/274; 60/286; 60/280; 60/606
(58) Field of Search .................. 60/284, 285, 286, 60/280, 275, 303, 274, 606, 599, 602, 616

(56) References Cited

U.S. PATENT DOCUMENTS

| | | | | |
|---|---|---|---|---|
| 5,207,058 A | * | 5/1993 | Sasaki et al. | 60/284 |
| 5,642,705 A | * | 7/1997 | Morikawa et al. | 123/300 |
| 5,665,318 A | * | 9/1997 | Rembold et al. | 422/177 |
| 6,041,591 A | * | 3/2000 | Kaneko et al. | 60/274 |
| 6,378,297 B1 | * | 4/2002 | Ito et al. | 60/284 |
| 6,481,200 B1 | * | 11/2002 | Hirota et al. | 60/284 |
| 6,536,209 B2 | * | 3/2003 | Fluga et al. | 60/284 |

* cited by examiner

Primary Examiner—Binh Tran
(74) Attorney, Agent, or Firm—Walter Ottesen

(57) ABSTRACT

A method and an arrangement serve to operate an internal combustion engine equipped with an exhaust-gas turbocharger. An after-injection takes place with the overlapment of the opening angle of the inlet and outlet valves of a cylinder. The after-injection leads to an air/fuel mixture in the exhaust-gas system which is combustible. This mixture is combusted by driving an additional ignition device in the exhaust-gas system.

8 Claims, 5 Drawing Sheets

METHOD AND ARRANGEMENT FOR OPERATING AN INTERNAL COMBUSTION ENGINE

FIELD OF THE INVENTION

The invention relates to a method and an arrangement for operating an internal combustion engine, especially of a charged internal combustion engine.

BACKGROUND OF THE INVENTION

Engines having exhaust-gas turbocharging display, as a rule, a torque weakness during start-to-drive. This applies especially to such engines without a variable geometry of the turbine of the exhaust-gas turbocharger. The reason for this is that the small exhaust-gas mass flow of the engine at a start-to-drive rpm leads to very poor rates of efficiency of the turbine as well as of the compressor of the exhaust-gas turbocharger. This results in a weak charge pressure buildup at low torque in the lower rpm range of the engine. In very extreme situations, for example, in steep mountain pass travel at high elevation with switched-in ancillary apparatus, a start-to-drive operation can be considerably impeded. German patent publication 199 44 190 discloses measures for increasing the efficiency of an exhaust-gas turbocharger. This is achieved with an after-injection which is carried out after the primary injection. With this after-injection, the energy content of the exhaust gas (especially the exhaust-gas enthalpy for the turbine of the exhaust-gas turbocharger) is persistently increased so that the response performance of the engine is significantly improved with a torque or power request as a consequence of the increased charge pressure. In this correction, it has been shown to be practical to so control the inlet and outlet valves of the cylinders during the after-injection so that there is a greater valve overlapping. In this way, a greater air throughput occurs at the turbine and a greater pressure occurs on the turbine so that a higher charge pressure can be built up. The after-injection is so undertaken that a combustible mixture results because of the air excess present in the individual combustion chambers and this combustible mixture then ignites as a consequence of the still running combustion and/or the high temperature. The generation of an air excess in the cylinders, in which the after-injection takes place, is likewise provided.

Another possibility of achieving an increase of the charge pressure in the lower rpm range is the use of an electrical turbocompressor, preferably a turbocompressor in the form of an ancillary charger to the exhaust-gas turbocharger. The electrical turbocompressor is driven in the low rpm range by driving its electric motor to increase the charge pressure. A large valve overlapment is pregiven either because of construction or is generated via an inlet camshaft shift and/or an outlet camshaft shift. In combination with the large valve overlapment and the large pressure drop between the intake manifold and the exhaust-gas system ahead of the turbine of the exhaust-gas turbocharger, a high scavenging air-mass flow results. This type of charged internal combustion engine having the possibility of an after-injection, which does not participate in the internal combustion process, has a considerable potential for a power increase in the described range.

There is also a need for a solution to the exhaust-gas enthalpy increase in charged internal combustion engines wherein an after-injection (which does not participate in the internal combustion process) is provided, preferably in combination with an externally driven electrical charger.

SUMMARY OF THE INVENTION

A significantly higher enthalpy drop across the turbine of the exhaust-gas turbocharger is generated by a combination of an after-injection with an external ignition assist which is placed upstream of the turbine of the exhaust-gas turbocharger in the exhaust-gas system. The after-injection does not participate in the internal combustion process.

In an advantageous manner, by the increase of the exhaust-gas enthalpy drop across the turbine of the exhaust-gas turbocharger, the start-drive performance of the vehicle is significantly improved as a consequence of the increased charge pressure.

A further advantage results with a combination of the exhaust-gas turbocharger with an additional ancillary charger, for example, an electrically driven charger which generates high scavenging air-mass flows through the internal combustion engine. This advantage is increased by an additional camshaft displacement which contributes to a larger valve overlapment and therefore to a further increase of the scavenging air-mass flow. The reason for this is the pressure drop, which is present between the intake manifold system and the exhaust-gas system. This pressure drop is significantly increased by the electrical ancillary charger. This pressure drop in combination with variable valve control times is used during the valve overlapment phase about top dead center for large scavenging air-mass flows during charge change (up to approximately 30% of the work air-mass flow). If, at the same time, an injection of fuel takes place, then an ignitable air/fuel mixture is formed which reliably ignites because of an ignition aid mounted upstream of the turbine of the exhaust-gas turbocharger and is combusted. In this way, the useful enthalpy drop increases significantly at the turbine of the exhaust-gas turbocharger and increases the available pressure at the compressor end.

In principle, the above-mentioned advantages are also obtained in charged internal combustion engines without an externally driven ancillary charger with an after-injection and a subsequent ignition in the exhaust-gas system.

It is also especially advantageous that the charger system can be transferred into a self-maintaining state via a suitable design of the components. In this way, after switchoff of the electrical ancillary charger of the exhaust-gas turbocharger, in combination with the additional enthalpy availability from the post-combustion of the scavenged air mass, the charge pressure increase can be maintained with this pressure charging increase being obtained by the additional charger.

The consequence is an operating point of favorable efficiency of the exhaust-gas turbocharger via the increased exhaust-gas mass and the increased enthalpy.

A further advantage of the described procedure is the fact that the additional ignition aid in combination with secondary air can be used for a more rapid heating of the catalytic converter to operating temperatures.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
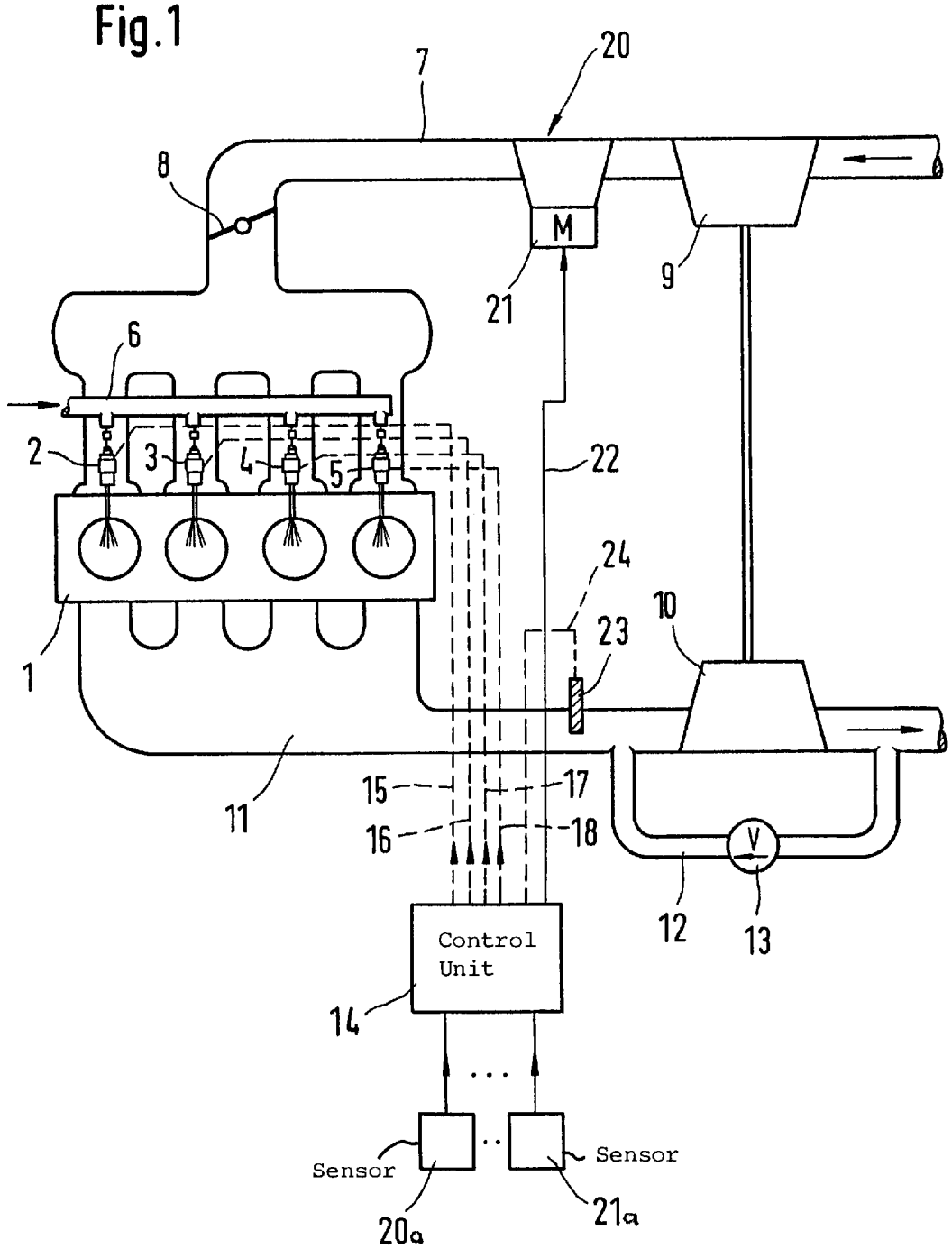
FIG. 1 is a schematic of an internal combustion engine having an exhaust-gas turbocharger and a control system.

FIG. 1 is a schematic of a direct-injecting internal combustion engine 1 having, for example, four cylinders and corresponding injection valves 2, 3, 4 and 5. The fuel is supplied to the injection valves 2, 3, 4 and 5, for example, via a common line 6. The direct-injecting internal combustion engine 1 can be a diesel engine or a spark-ignition engine.

The internal combustion engine shown in FIG. 1 is equipped with an exhaust-gas turbocharger. Reference numeral 7 identifies an intake channel wherein a throttle flap 8 is disposed as is a compressor 9, which is mechanically coupled to a turbine 10. The turbine 10 is driven by the exhaust-gas flow in the exhaust-gas channel 11. The turbine is bridged by a bypass line 12 in a manner known per se. A bypass valve 13 is mounted in the bypass line 12, wherewith the charge pressure, which is generated by the turbocharger, can be controlled.

A control unit 14 is provided for controlling the fuel injection and this control unit is connected to the injection valves 2, 3, 4 and 5 via respective control lines 15, 16, 17 and 18. Furthermore, the control unit 14 receives information from sensors 20a to 21a which detect the accelerator pedal position and other operating variables of the engine or motor vehicle.

In addition, an externally actuable ancillary charger 20 is provided in the intake manifold system 7 of the engine between the compressor 9 of the exhaust-gas turbocharger and the throttle flap 8. The ancillary charger 20 is especially an electrical compressor, which is actuated by means of an electric motor 21. The motor 21 is actuated via the control line 22 by the electronic control unit 14. In another embodiment, the ancillary charger is built in ahead of the compressor in flow direction. Furthermore, an additional ignition assist 23, such as a glow plug, is mounted in the exhaust-gas system ahead of the turbine 10 of the exhaust-gas turbocharger. The ignition assist is driven via a control line 24 by the electronic control unit 14.

As shown in FIG. 1, the preferred embodiment includes a turbo-charged internal combustion engine which, to improve the dynamic performance, is equipped additionally with an external charger and an additional ignition assist (for example, a glow plug) upstream of the turbine of the exhaust-gas turbocharger. In other embodiments, a variable camshaft displacement is provided in addition or the external charger is omitted.

The embodiment described below having an external charger and a variable camshaft displacement is to be correspondingly adapted when one or the other component is omitted. The illustrated arrangement is also applicable in combination with intake manifold injection engines.

If the driver signals a start-drive operation or a demand for acceleration or if a full-load demand from the driver is present, then the external charger is activated to increase the response performance of the engine. With the presence of the variable valve control, the inlet camshaft is displaced to the earliest possible position in the full-load near region and at low engine rpms for the purpose of the supply efficiency optimization and for the purpose of the scavenging air optimization (large valve overlapment). Fuel (which, with the air, defines a combustible air/fuel mixture) is supplied to the scavenging air-mass flow, which, in the phase of the valve opening overlapment, flows through the corresponding cylinder because of the activation of the external charger. The mixture is ignited via the additional ignition aid in the exhaust-gas system. The subsequent combustion leads to a significant increase of the exhaust-gas temperature and therefore to an increase of the useable enthalpy drop across the turbine. This procedure in a spark-ignition engine can be applied also in combination with a diesel engine. Here too, in the context of an after-injection, fuel is supplied to the scavenging air mass (at least when using a common-rail system) which forms a combustible mixture. The advantageous effects of this procedure correspond to the effects for a spark-ignition engine.

When reaching an adequately high charge pressure, the additional ancillary charger is switched off. The exhaust-gas turbocharger achieves an operating point of improved efficiency because of the exhaust-gas mass flow (which, up to this time point is greatly increased) in combination with the larger useable enthalpy drop resulting from the after-injection. In this way, the internal combustion engine can maintain its operating point by means of the after-injection also without the ancillary charger and without a time limitation. At the end of the start-drive operation or the acceleration operation or the full-load phase, the after-injection is switched off.

In lieu of the electric ancillary charger, exhaust-gas turbochargers having variable geometry are used for support.

The above-described procedure is realized in the preferred embodiment as a program of a microcomputer of the control unit 14. The structure of such a program is shown in the sequence diagram of FIG. 2.

Figure 2:
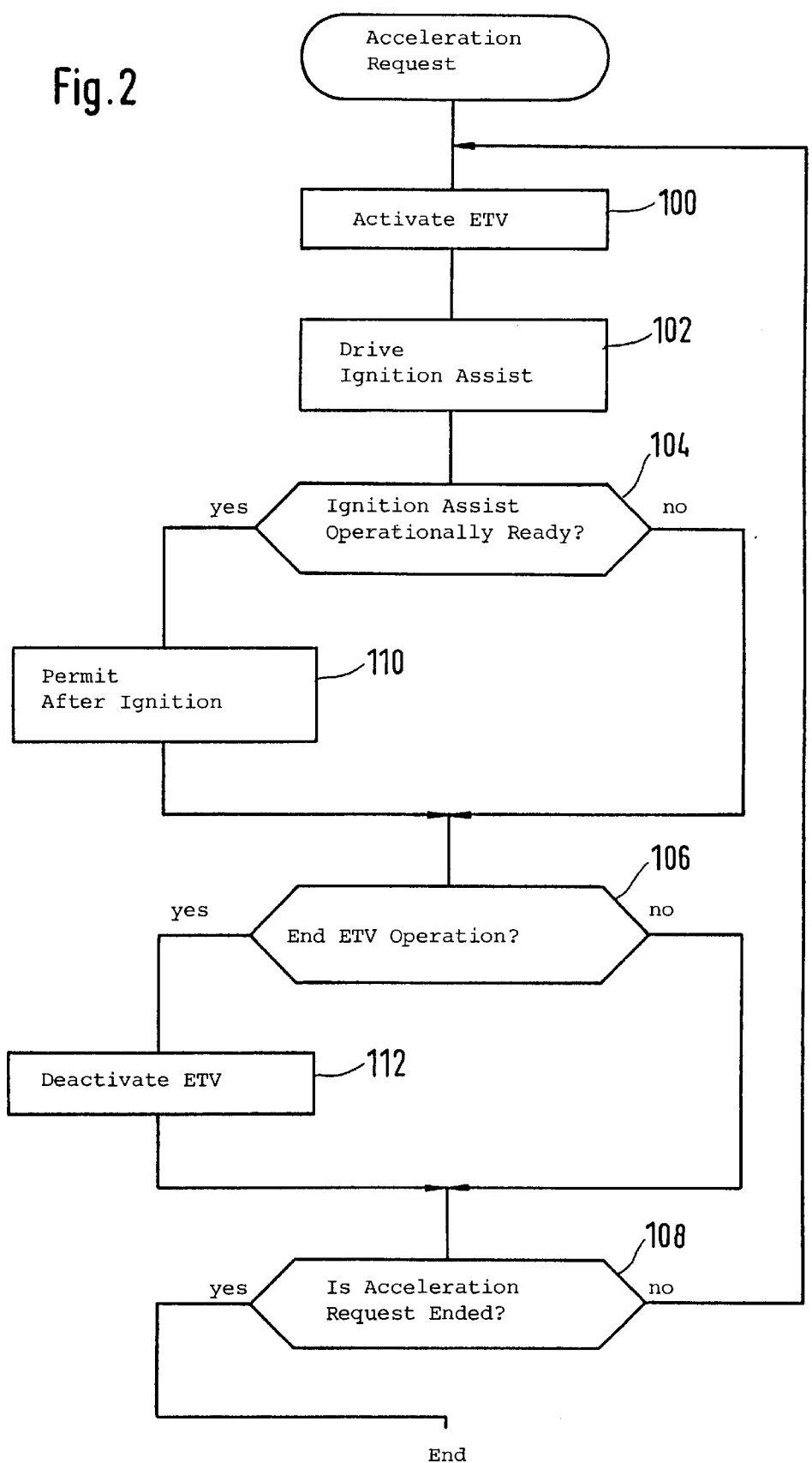
FIG. 2 is a flowchart showing the steps for carrying out the method of the invention.

When an acceleration request from the driver is present, the program shown in FIG. 2 is called up. An acceleration request is recognized, for example, by a change of the driver command (time-dependent change exceeds a threshold value). Other operating situations wherein the program is called up are a full-load request of the driver (completely or almost completely actuated accelerator pedal) or a start-drive command of the driver (for example, by setting a transmission gear, actuating the clutch, actuating the accelerator pedal, et cetera). When such an occurrence initiating the program is recognized, then, in step 100, the additional ancillary charger (electric turbocompressor ETV) is activated. This takes place via the output of an output signal to the electric motor. The drive signal is fixed or dependent on operating variables depending on the configuration. In the next step 102, the ignition assist is driven. In the preferred embodiment, this ignition assist is a glow plug in the exhaust-gas system of the engine to which a drive signal of pregiven intensity is outputted by the electronic control unit. Thereupon, in step 104, a check is made as to whether the ignition assist is operationally ready. For a glow plug, this is the case when a specific temperature is reached. This is recognized, for example, from the elapse of a predetermined time duration after the beginning of the drive of the glow plug based on an exhaust-gas temperature signal or a temperature signal of a glow plug, et cetera. If the ignition is not operationally ready, then, in the next step 106, a check is made as to whether the additional charging operation has ended. This is preferably the case when the charge pressure has reached a specific boundary value (in another application, the elapse of a pregiven time has been shown to be suitable). If this boundary value is not reached, then, in step 108, a check is made as to whether the triggering operating phase, the acceleration request, the full-load request or the start-drive operation is ended. The acceleration phase is ended, for example, when the driver releases the accelerator pedal or a steady-state condition is reached. The full-load request is ended when the accelerator pedal leaves the full-load region. The start-drive operation is ended when reaching a specific vehicle speed.

When the operational phase is ended, the program is likewise ended; otherwise, the program is repeated with step 100. If the inquiry in step 104 has shown that the ignition assist is operationally ready, then, in step 110, the after-injection is permitted. Fuel is injected into the cylinder in the region of top dead center during charge change and for valve overlapment. The electric control apparatus outputs corresponding drive signals to the injection valves. Here, the after-injection takes place always only in the cylinder, wherein the valve overlapment is present. The fuel mass, which is injected with the after-injection, is so dimensioned that a combustible air/fuel mixture results. Depending upon the configuration, this air/fuel mixture is fixedly pregiven or is dependent on operating variables (for example, dependent upon air-mass flow or the charge of the cylinder, on the charge pressure, on the pressure drop between the intake manifold and the exhaust-gas system, et cetera); however, for each case, an ignition and combustible mixture must be provided.

If it was determined in step 106 that the pregiven charge pressure has been reached or the time has elapsed, then, according to step 112, the additional charger is switched off, that is, no drive signal for the engine is outputted any longer.

Figure 3:
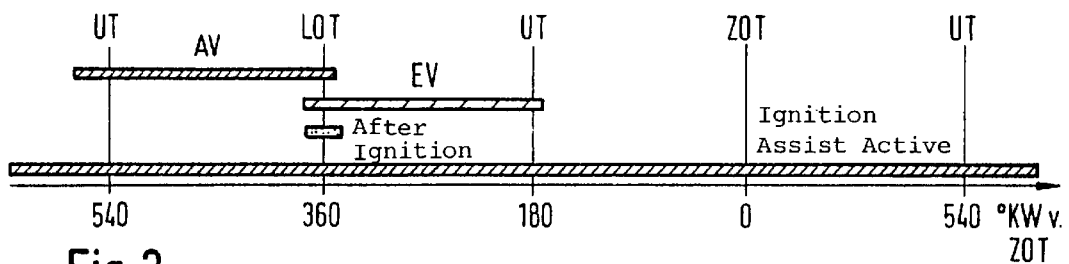
FIG. 3 is a graph showing the position of the after-injection relative to the crankshaft angle.

FIG. 3 shows, based on the example of a cylinder, the position of the after-injection. The crankshaft angle is plotted along the horizontal. The opening angle of the outlet valve AV is shown which extends from shortly ahead of bottom dead center (UT) up to shortly after top dead center (OT) of the charge change phase (charge change LOT) as well as the opening angle of the inlet valve (EV), which extends from shortly ahead of the charge change OT up to shortly after the subsequent lower dead point (UT). In the region of the charge change (OT), there is a valve overlapment angle wherein the after-injection takes place. The next primary injection into this cylinder takes place in the region of top dead center in the ignition phase (ignition OT; ZOT) and an after-injection takes place when next reaching top dead center (charge change OT). The fuel, which is injected with the primary injection, is combusted in the combustion chamber for generating torque by means of the ignition. During the entire time, the ignition assist is active, that is, in the case of a glow plug, driven.

Figure 4A:
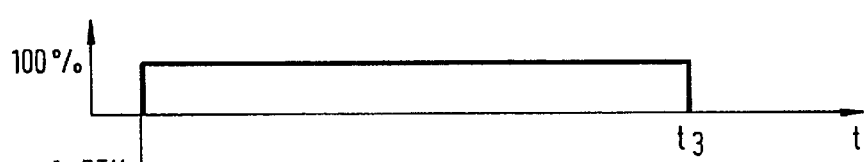
FIGS. 4a to 4f show essential operating variables plotted a a function of time.
Figure 4B:
Figure 4C:
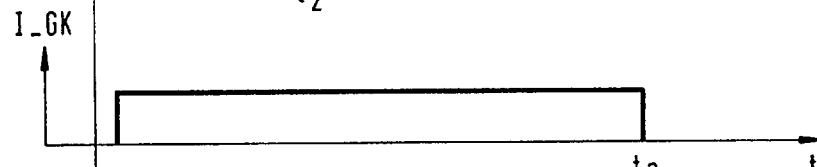
Figure 4D:
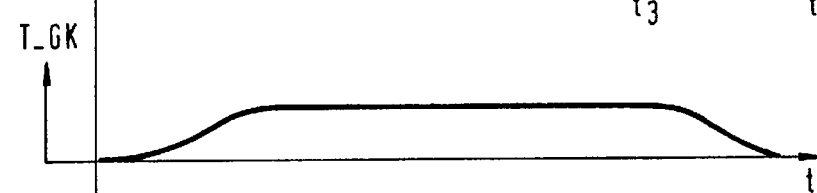
Figure 4E:
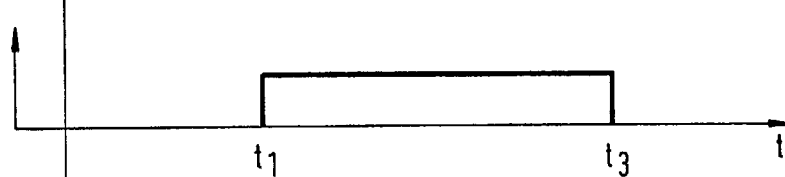
Figure 4F:
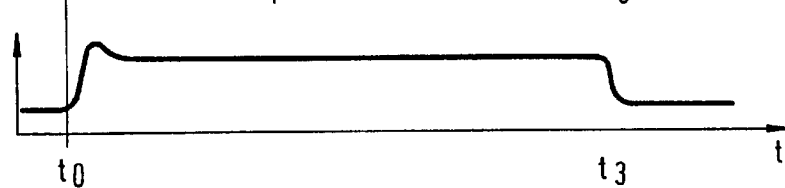

FIGS. 4a to 4f show time diagrams of essential operating variables in combination with the above-described procedure. FIG. 4a shows a time-dependent trace of the accelerator pedal path β and FIG. 4b shows the time-dependent trace of the current through the actuating motor of the electric turbocompressor $I_{etv}$. FIG. 4c shows the current in the ignition assist (glow plug) $I_{gk}$. FIG. 4d shows the temperature of the glow plug $T_{gk}$ and FIG. 4e shows the time range in which the after-injection is permitted. FIG. 4f shows the time-dependent trace of the charge pressure.

At time point T0, the driver actuates the accelerator pedal to 100%. Accordingly, the driver demands full load. For this reason, the ancillary charger is driven at time point T0. Correspondingly, FIG. 4b shows a current trace. As a consequence of the actuation of the ancillary charger, the charge pressure increases immediately after the time point T0. Shortly after time point T0, the additional ignition means is switched on in accordance with FIG. 4c. This leads to a slow increase of the temperature of the glow plug. Until then, the effect of the ancillary charger is that the charge pressure assumes a very high value already shortly after the time point T0. After elapse of a certain time, the ignition assist is operationally ready so that, at time point T1, the after-injection is permitted. When reaching the desired charge pressure at time pont T2, the ancillary charger is switched off (see FIG. 4b). The driver releases the accelerator pedal at time pont T3 (see FIG. 4a). This leads to the switchoff of the ignition assist (FIG. 4c) and to the switchoff of the after-injection (FIG. 4e). Correspondingly, the charge pressure again drops starting from time point T3. Likewise, the temperature of the glow plug decreases in accordance with FIG. 4d.

Figure 5:
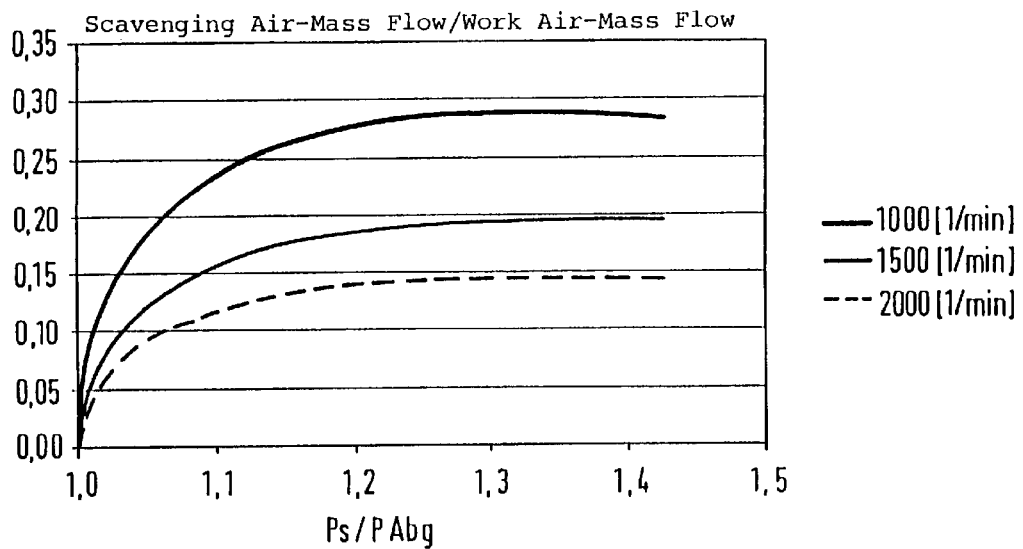
FIG. 5 is a plot showing the relationship of the intake manifold pressure to the exhaust-gas counterpressure and the relationship of the scavenging air-mass flow to the work air-mass flow for various engine rpms.

FIG. 5 shows a diagram wherein the ratio of the intake manifold pressure to the exhaust-gas counterpressure and the ratio of scavenging air-mass flow to work air-mass flow is shown for various engine rpms. The pressure ratio is plotted on the horizontal and the mass flow ratio on the vertical. Here it is shown that the higher the pressure drop between the intake manifold and the exhaust-gas system, the greater is the mass flow ratio. More specifically, large scavenging air mass flows yield also large pressure ratios between intake manifold and exhaust-gas system. As mentioned above, this characteristic explains the advantageous effect of the externally driven ancillary charger.

Figure 6:
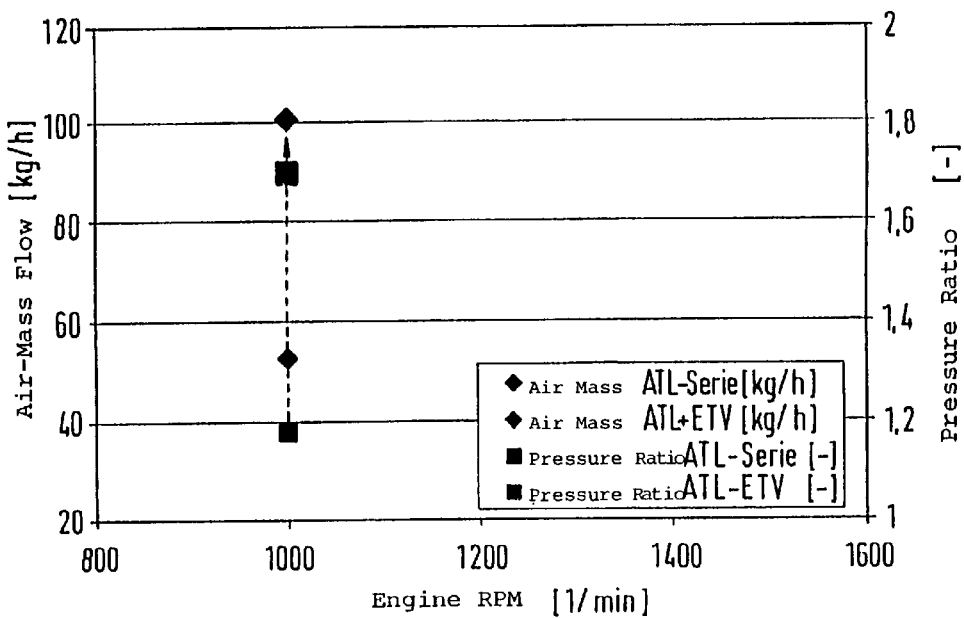
FIG. 6 is a graph showing the air-mass flow plotted against engine rpm as well as the pressure ratio plotted against the engine rpm.

In FIG. 6, the air-mass flow (lozenge) and the pressure ratio (square) is plotted as a function of engine speed (rpm). In the example of the engine rpm of 1000 revolutions per minute, it is shown that, because of the additional energy of the externally driven ancillary charger and the afterburning, a considerable increase of pressure ratio and air-mass flow is achieved. This pressure ratio is raised from approximately 1.2 for a conventional exhaust-gas turbocharger to a value of approximately 1.7 in the embodiment shown; whereas, the air-mass flow of approximately 55 kg/h for conventional systems can be increased to approximately 100 kg/h. For this reason, an increased pressure availability at the compressor end can be attained and the efficiency of the exhaust-gas turbocharger system increased.

Figure 7:
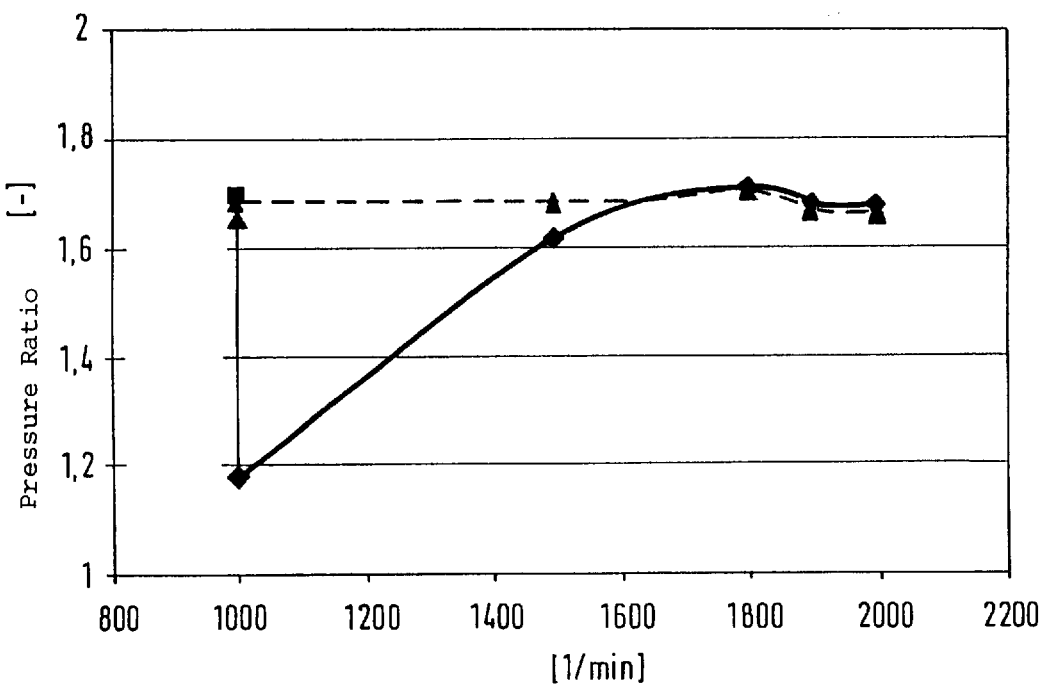
FIG. 7 is a plot of the pressure ratio plotted as a function of engine rpm compared to a conventional exhaust-gas turbocharger and an exhaust-gas turbocharger having an electric ancillary charger and aftercombustion.

FIG. 7 shows the pressure ratio plotted as a function of engine rpm in comparison to a conventional exhaust-gas turbocharger and an exhaust-gas turbocharger having an electric ancillary charger and aftercombustion. It is shown that, in the region of low engine rpms, the conventional exhaust-gas turbocharger (solid line) exhibits a small, slowly rising pressure ratio; whereas, the exhaust-gas turbocharger system with afterburning reaches a high pressure ratio already for low rpms. The high charge pressure, which is achieved already at low rpms, can be maintained over a large engine rpm range.

Figure 8:
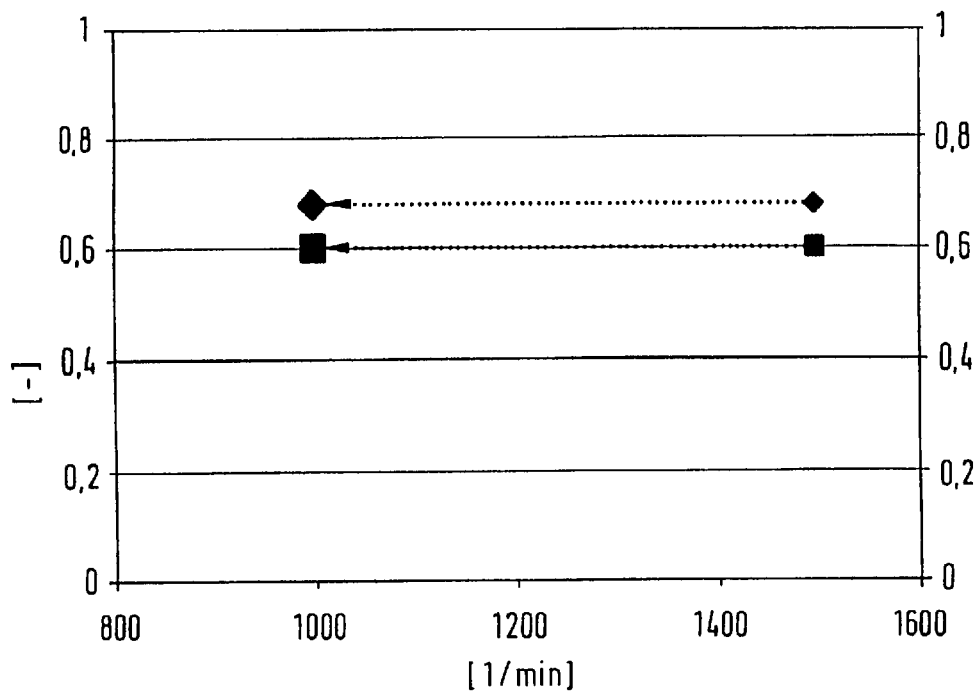
FIG. 8 is a graph showing the computed efficiency of the exhaust-gas turbocharger system plotted as a function of engine rpm.

In FIG. 8, the efficiency (isotropic compression efficiency) of the exhaust-gas turbocharger system is plotted as a function of engine rpm, with this efficiency being computed for the particular operating states. With the lozenge, the turbine efficiency is shown, and with the square, the compressor efficiency is shown. The corresponding efficiency values of the conventional exhaust-gas turbochargers are in the range of 0.4 at 1000 revolutions per minute and increase into the range between 0.6 and 0.7 at 1500 revolutions per minute. With the usage of the additional ancillary charger and the afterburning, an efficiency in the range of 0.6 to 0.7 is reached already at 1000 rpm because of the shift of the operating point; that is, the situation at 1500 revolutions per minute is reached already at considerably lower engine rpms. This improves the start-drive performance considerably.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine including an exhaust-gas system and an exhaust-gas turbocharger having a turbine mounted in said exhaust-gas system, the method comprising the steps of:

providing an ignition device in said exhaust-gas system upstream of said turbine of said exhaust-gas turbocharger;

making a primary injection into at least one cylinder of said engine;

triggering an after-injection into said cylinder thereby generating a combustible air/fuel mixture; and, igniting the air/fuel mixture of said after-injection by driving said ignition device.

2. The method of claim 1, wherein said cylinder includes an inlet valve and an outlet valve; and, wherein said after-injection is caused to take place when the opening angles of said inlet and outlet valves overlap.

3. A method for operating an internal combustion engine including an exhaust-gas turbocharger, an external operable ancillary charger as a supplement to said exhaust-gas turbocharger and an exhaust-gas system, the method comprising the steps of:

providing an ignition device in said exhaust-gas system;

making a primary injection into at least one cylinder of said engine;

triggering an after-injection into said cylinder thereby generating a combustible air/fuel mixture;

igniting the air/fuel mixture of said after-injection by driving said ignition device; and, activating said external operable charger in at least one operating situation.

4. The method of claim 3, comprising the further step of driving said ignition device and permitting said after-injection for at least one of the following: a full-load request, an acceleration request and a start-drive operation.

5. The method of claim 3, comprising the further step of switching in said external operable ancillary charger at the beginning of said at least one operating situation.

6. The method of claim 3, comprising the further step of switching off said external operable ancillary charger when a switch-off criterion is reached.

7. A method for operating an internal combustion engine having an exhaust-gas turbocharger and an exhaust-gas system, the method comprising the steps of:

providing an ignition device in said exhaust-gas system;

making a primary injection into at least one cylinder of said engine;

triggering an after-injection into said cylinder thereby generating a combustible air/fuel mixture;

igniting the air/fuel mixture of said after-injection by driving said ignition device; and, wherein said engine includes a variable time control which undertakes a change of the valve opening so that a largest possible angle overlapment of the valve openings is present.

8. An arrangement for operating an internal combustion engine including a turbocharger having a turbine and an exhaust-gas system, the arrangement comprising:

an electronic control unit functioning to trigger a primary injection into each cylinder of said engine;

said electronic control unit further functioning to trigger an after-injection in at least one cylinder of said engine in at least one operating situation whereby a combustible air/fuel mixture is formed;

said turbine being mounted in said exhaust-gas system;

an additional ignition device mounted in said exhaust-gas system upstream of said turbine; and, said electronic control unit functioning to drive said ignition device to ignite the air/fuel mixture in said exhaust-gas system ahead of the turbine of said turbocharger.

* * * * *